(12) United States Patent
Cabaj et al.

(10) Patent No.: US 10,995,487 B2
(45) Date of Patent: May 4, 2021

(54) UNDERCUT ANCHOR, UNDERCUT ANCHOR MANUFACTURING METHOD, AND ANCHORING METHOD

(71) Applicant: Illinois Tool Works Inc., Glenview, IL (US)

(72) Inventors: Stanley J. Cabaj, Park Ridge, IL (US); Tomasz Sikora, River Grove, IL (US)

(73) Assignee: Illinois Tool Works Inc., Glenview, IL (US)

( * ) Notice: Subject to any disclaimer, the term of this patent is extended or adjusted under 35 U.S.C. 154(b) by 226 days.

(21) Appl. No.: 16/109,030

(22) Filed: Aug. 22, 2018

(65) Prior Publication Data

US 2019/0093337 A1 Mar. 28, 2019

Related U.S. Application Data

(60) Provisional application No. 62/563,933, filed on Sep. 27, 2017.

(51) Int. Cl.
*F16B 13/06* (2006.01)
*F16B 13/10* (2006.01)
(Continued)

(52) U.S. Cl.
CPC .......... *E04B 1/4157* (2013.01); *E04B 1/4121* (2013.01); *F16B 7/18* (2013.01); *F16B 13/06* (2013.01); *F16B 13/0858* (2013.01); *F16B 13/124* (2013.01); *F16B 37/122* (2013.01); *F16B 11/008* (2013.01); *F16B 13/126* (2013.01); *F16B 13/128* (2013.01)

(58) Field of Classification Search
CPC .... E04B 1/4157; E04B 1/4121; F16B 13/063; F16B 13/124; F16B 13/0858; F16B 13/136; F16B 13/126; F16B 13/128; F16B 13/12; F16B 37/122
USPC .............................. 411/60.1, 63, 57.1, 75, 80
See application file for complete search history.

(56) References Cited

U.S. PATENT DOCUMENTS

| 734,326 A | 7/1903 | Hicks |
|---|---|---|
| 925,006 A | 6/1909 | Mason |

(Continued)

FOREIGN PATENT DOCUMENTS

| DE | 30 44 453 | 6/1982 |
|---|---|---|
| EP | 0 365 475 | 4/1990 |

(Continued)

OTHER PUBLICATIONS

International Search Report and Written Opinion for International Application No. PCT/US2018/047663, dated Oct. 11, 2018 (13 pages).

(Continued)

*Primary Examiner* — Jack W Lavinder
(74) *Attorney, Agent, or Firm* — Neal, Gerber & Eisenberg LLP

(57) ABSTRACT

In certain embodiments, the present disclosure provides an undercut anchor including an attachment barrel and a cylindrical plug positioned in and moveable in the attachment barrel. The attachment barrel includes a cylindrical body, an outer rim extending outwardly and away from a bottom end of the body, and a plurality of independently pivotable gripping arms extending from a top end of the body.

14 Claims, 10 Drawing Sheets

(51) Int. Cl.
*E04B 1/41* (2006.01)
*F16B 7/18* (2006.01)
*F16B 13/12* (2006.01)
*F16B 13/08* (2006.01)
*F16B 37/12* (2006.01)
*F16B 11/00* (2006.01)

(56) References Cited

U.S. PATENT DOCUMENTS

| | | | |
|---|---|---|---|
| 965,746 A | 7/1910 | Richards | |
| 1,000,715 A | 8/1911 | Caywood | |
| 1,065,747 A | 6/1913 | Tuck | |
| 1,115,205 A | 10/1914 | Johnson | |
| 1,164,322 A | 12/1915 | Yeatman | |
| 1,470,858 A | 10/1923 | Maxwell | |
| 1,755,590 A | 4/1930 | Carr | |
| 2,561,433 A | 7/1951 | Uhle | |
| 3,217,583 A | 11/1965 | Fulop | |
| 3,620,120 A | 11/1971 | Warner | |
| 3,628,816 A | 12/1971 | Ross, Jr. | |
| 4,135,432 A | 1/1979 | Schalge et al. | |
| 4,259,890 A * | 4/1981 | Walsh | F16B 13/126 411/55 |
| D262,093 S | 12/1981 | Bush et al. | |
| 4,481,702 A | 11/1984 | Mitchell | |
| 4,720,224 A | 1/1988 | Peterken | |
| 4,883,395 A | 11/1989 | Klavic | |
| 4,890,965 A | 1/1990 | Dietlein | |
| 4,904,135 A | 2/1990 | Barthomeuf et al. | |
| 4,929,134 A | 5/1990 | Bergner | |
| 4,973,212 A | 11/1990 | Jacobs | |
| 5,183,357 A | 2/1993 | Palm | |
| 5,246,323 A | 9/1993 | Vernet et al. | |
| 5,314,278 A | 5/1994 | Weber | |
| 5,332,346 A | 7/1994 | Shinjo | |
| 5,342,157 A * | 8/1994 | Fischer | F16B 13/12 411/57.1 |
| 5,419,664 A | 5/1995 | Hengesbach | |
| 5,476,350 A | 12/1995 | Kurtz et al. | |
| 5,580,204 A | 12/1996 | Hultman | |
| 5,613,818 A | 3/1997 | McCorkle et al. | |
| 5,690,455 A | 11/1997 | Fischer et al. | |
| 5,746,557 A | 5/1998 | Kaibach | |
| 5,816,759 A | 10/1998 | Ernst et al. | |
| 5,911,550 A | 6/1999 | Popp et al. | |
| 6,270,303 B1 | 8/2001 | Gauthier et al. | |
| 6,325,580 B1 | 12/2001 | Diamond | |
| 6,364,134 B1 | 4/2002 | Christy | |
| 6,524,046 B2 | 2/2003 | Hsu | |
| 6,827,535 B2 | 12/2004 | Fuchs et al. | |
| 6,829,871 B1 | 12/2004 | McSherry et al. | |
| 6,942,439 B2 | 9/2005 | Rouger | |
| D557,409 S | 12/2007 | Veliss et al. | |
| 7,357,613 B2 | 4/2008 | Houck et al. | |
| 7,587,873 B2 | 9/2009 | McSherry et al. | |
| 7,713,010 B2 | 5/2010 | Cheng | |
| 7,744,320 B2 | 6/2010 | Kobetsky et al. | |
| 7,811,037 B2 | 10/2010 | Kobetsky et al. | |
| 8,251,625 B2 | 8/2012 | Zimmer et al. | |
| 8,287,218 B2 | 10/2012 | Zimmer et al. | |
| 8,302,276 B2 | 11/2012 | Kobetsky et al. | |
| 8,444,355 B2 | 5/2013 | Gaudron et al. | |
| 8,491,244 B2 | 7/2013 | Kobetsky et al. | |
| 8,678,730 B2 | 3/2014 | Harrington et al. | |
| 8,974,163 B2 | 3/2015 | Ricketts | |
| D752,963 S | 4/2016 | Kaupp | |
| 9,512,868 B2 | 12/2016 | Stempniewski et al. | |
| 9,541,116 B2 | 1/2017 | Cabaj et al. | |
| 9,970,465 B2 | 5/2018 | Gstach et al. | |
| 9,970,467 B2 | 5/2018 | Dijkhuis et al. | |
| 2002/0076298 A1 * | 6/2002 | Gauthier | F16B 13/12 411/57.1 |
| 2004/0096288 A1 | 5/2004 | Haug | |
| 2010/0272536 A1 | 10/2010 | Kaplan et al. | |
| 2010/0303578 A1 * | 12/2010 | Armiento | B23B 51/08 411/57.1 |
| 2011/0081217 A1 | 4/2011 | Wissling et al. | |
| 2012/0128444 A1 | 5/2012 | Podesser et al. | |
| 2012/0263553 A1 | 10/2012 | Greenfield | |
| 2014/0010613 A1 | 1/2014 | Gaudron et al. | |
| 2014/0072384 A1 | 3/2014 | Wissling | |
| 2015/0275950 A1 | 10/2015 | Hongthong et al. | |
| 2017/0114818 A1 | 4/2017 | Cabaj et al. | |
| 2017/0138384 A1 | 5/2017 | Goettlich | |
| 2017/0167139 A1 | 6/2017 | Pregartner et al. | |
| 2017/0241128 A1 | 8/2017 | Murdoch | |
| 2017/0241458 A1 | 8/2017 | Murdoch | |

FOREIGN PATENT DOCUMENTS

| | | | | |
|---|---|---|---|---|
| EP | 3109490 A1 * | 12/2016 | | F16B 37/122 |
| FR | 2 050 657 | 4/1971 | | |
| FR | 2 106 884 | 5/1972 | | |
| GB | 2 254 392 | 10/1992 | | |
| WO | WO 2016/207404 | 12/2016 | | |

OTHER PUBLICATIONS

"Concrete Anchor Bolts for Pedestrian Barrier" web page by Global Industrial printed Jun. 30, 2014 (2 pages).
"Dock Bumper Installation Bolt" web page by Global Industrial printed Jun. 30, 2014 (2 pages).
Drop-In Anchors, retrieved from the Internet at https://www.confast.com/products/drop-in-anchor.aspx, on Oct. 10, 2017 (5 pages).
Machine Screw Anchors, retrieved from the Internet at https://www.confast.com/products/machinescrew-anchor.aspx, on Oct. 10, 2017 (3 pages).
Multi-Set II® Drop-In Anchors—RedHead®, retrieved from the Internet at http://www.itwredhead.ca/product/12/multi-set-ii-drop-in-anchors, on Oct. 10, 2017 (5 pages).
"Trubolt+ Seismic Wedge" brochure by Red Head Concrete Anchoring dated Feb. 2012 (3 pages).
"Wedge Anchors" web page by Concrete Fastening Systems printed Jun. 30, 2014 (4 pages).

* cited by examiner

UNDERCUT ANCHOR, UNDERCUT ANCHOR MANUFACTURING METHOD, AND ANCHORING METHOD

CROSS-REFERENCE TO RELATED APPLICATION

This application is related to the following commonly owned co-pending patent application: U.S. application Ser. No. 29/619,176, entitled "UNDERCUT ANCHOR ATTACHMENT BARREL,".

PRIORITY

This application claims priority to and the benefit of U.S. Provisional Patent Application Ser. No. 62/563,933, filed Sep. 27, 2017, the entire contents of which are incorporated herein by reference.

BACKGROUND

Concrete structures such as wall(s), floors, and ceilings are widely used throughout the construction industry. Such concrete structures are typically constructed from fluid concrete poured into a mold or other suitable formwork. A grid of reinforcement members (such rebar) is typically positioned in the formwork to provide reinforcement for the concrete (poured into the formwork about the reinforcement members). After pouring, the concrete is allowed to dry, cure, and harden to form the concrete structure. The reinforcement members are typically embedded in the cured concrete at a specific depth.

After a concrete structure is formed (such as after a concrete ceiling is formed) in a building, known anchors are often installed in holes drilled in the concrete structure such as a concrete ceiling to facilitate attaching or hanging building equipment (such as fire sprinklers, ducting, pipes, cables, etc.) to or from the concrete structure such as the concrete ceiling. The holes are typically drilled in the concrete structure such as the ceiling to a depth less than the specific depth of the reinforcement members to avoid these reinforcement members from interfering with the proper anchor installation.

Certain issues exist with certain known concrete ceilings and certain known anchors. In certain situations, the concrete ceilings have or can develop one or more cracks due to age, settling of the building, stresses on the building, seismic activity, etc. In cases where a concrete ceiling is cracked, known anchors may not fully or suitably grip the concrete of the ceiling (as tightly as compared to uncracked concrete ceilings). In certain cases, known anchors have failed in such concrete structures, and have also failed to meet regulatory requirements such as building codes.

Accordingly, there is a need to address the above issues.

SUMMARY

The present disclosure provides an undercut anchor, a method of forming an undercut anchor, and an anchoring method that address and overcome the above described issues.

In various example embodiments, the undercut anchor of the present disclosure is configured to be employed in a concrete structure such as a concrete ceiling to facilitate hanging building equipment from the concrete ceiling. The undercut anchor is configured to be inserted into a hole drilled in the concrete ceiling (to a specified depth). In various example embodiments, the undercut anchor of the present disclosure generally includes an attachment barrel and a moveable cylindrical plug positioned in the attachment barrel. In various example embodiments, The attachment barrel generally includes independently pivotable gripping arms configured to move or pivot outwardly against the surfaces of the wall(s) that define the hole drilled in the concrete ceiling. In various example embodiments, the pivotable gripping arms each include an inner ramp and an outwardly extending barb. It should be appreciated that the outwardly extending barb can be provided in any suitable form in accordance with the present disclosure.

After the undercut anchor is placed in the hole, the plug is moved inside of the attachment barrel into engagement with the inner ramps. This causes the pivotable gripping arms to pivot and spread apart from one another which causes the barbs to cut into and embed in the inner wall(s) that define the hole. In various embodiments, the gripping arms partially deform when the plug causes the gripping arms to spread apart and the barbs to cut into the inner wall(s) that define the hole. Once the barbs are embedded in the inner wall(s), the undercut anchor is strongly anchored in the hole in the concrete ceiling, even if the concrete ceiling is cracked or becomes cracked. The anchor enables a suitable fastener to be connected to the anchor to hang an object from the concrete ceiling.

It should be appreciated that the undercut anchor of the present disclosure is configured to be employed in other concrete structures besides concrete ceilings. It should also be appreciated that the undercut anchor of the present disclosure is configured to be employed in other structure besides concrete structures.

Additional features and advantages of the present disclosure are described in, and will be apparent from, the following Detailed Description and the Figures.

DETAILED DESCRIPTION OF EXAMPLE EMBODIMENTS

The present disclosure provides an undercut anchor, a method of forming or manufacturing an undercut anchor, and a method of using an undercut anchor that overcomes or address the above described issues. An example embodiment of an undercut anchor of the present disclosure, a method of forming or manufacturing the undercut anchor, and a method of using the undercut anchor is discussed below; however, it should be appreciated that the present disclosure is not limited to the example undercut anchor, the example method of forming the undercut anchor, or the example method of using the undercut anchor described below.

Referring now to FIGS. 1 to 10, one example embodiment of a shell type undercut anchor, anchor forming method, and anchoring method of the present disclosure is generally illustrated. The undercut anchor of this illustrated example embodiment is generally indicated by numeral 100.

Figure 6:
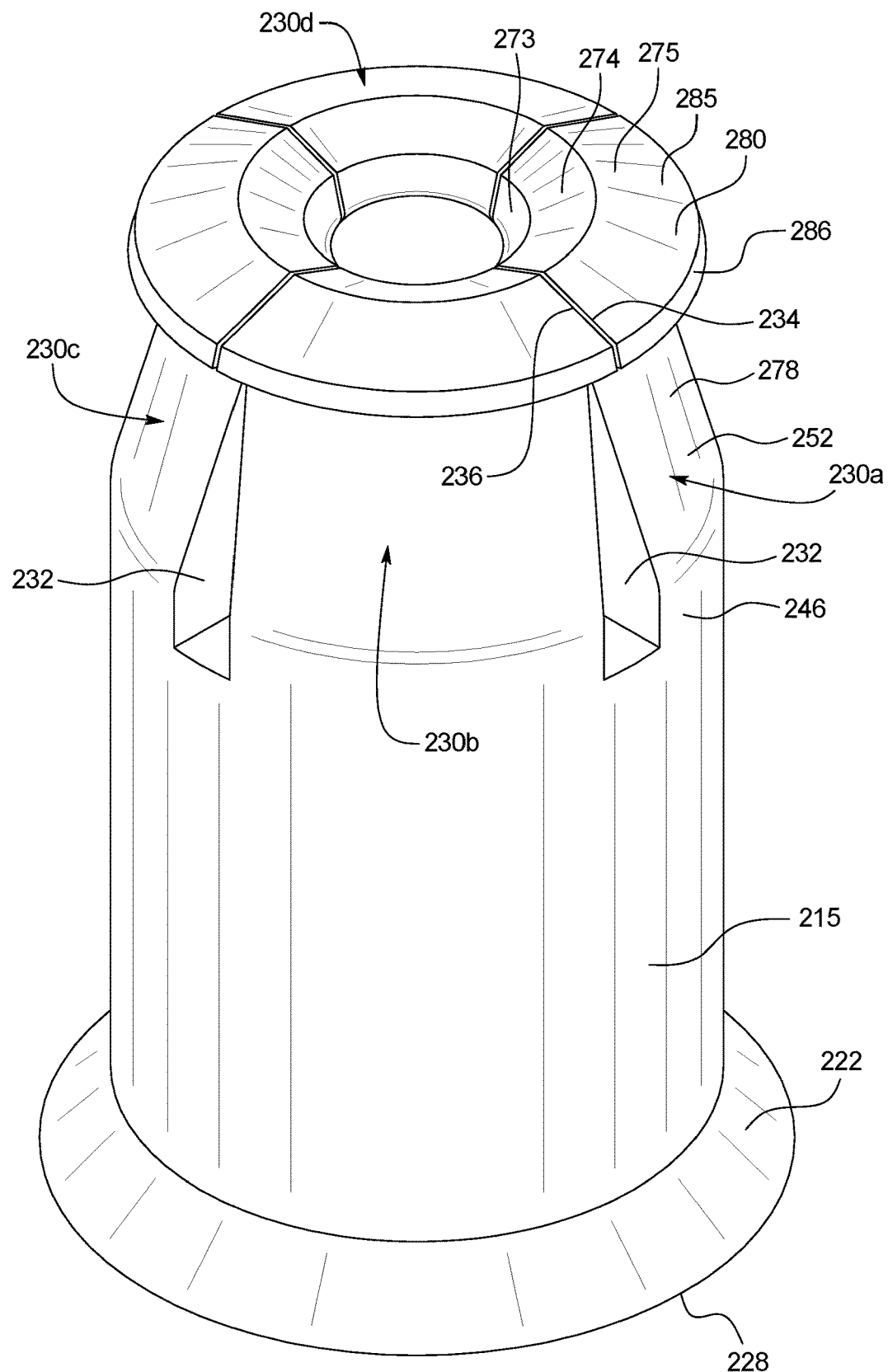
FIG. 6 is an enlarged top perspective view of the undercut anchor of FIG. 1 after the first end of the attachment barrel of the undercut anchor is formed for insertion into a hole.
Figure 7:
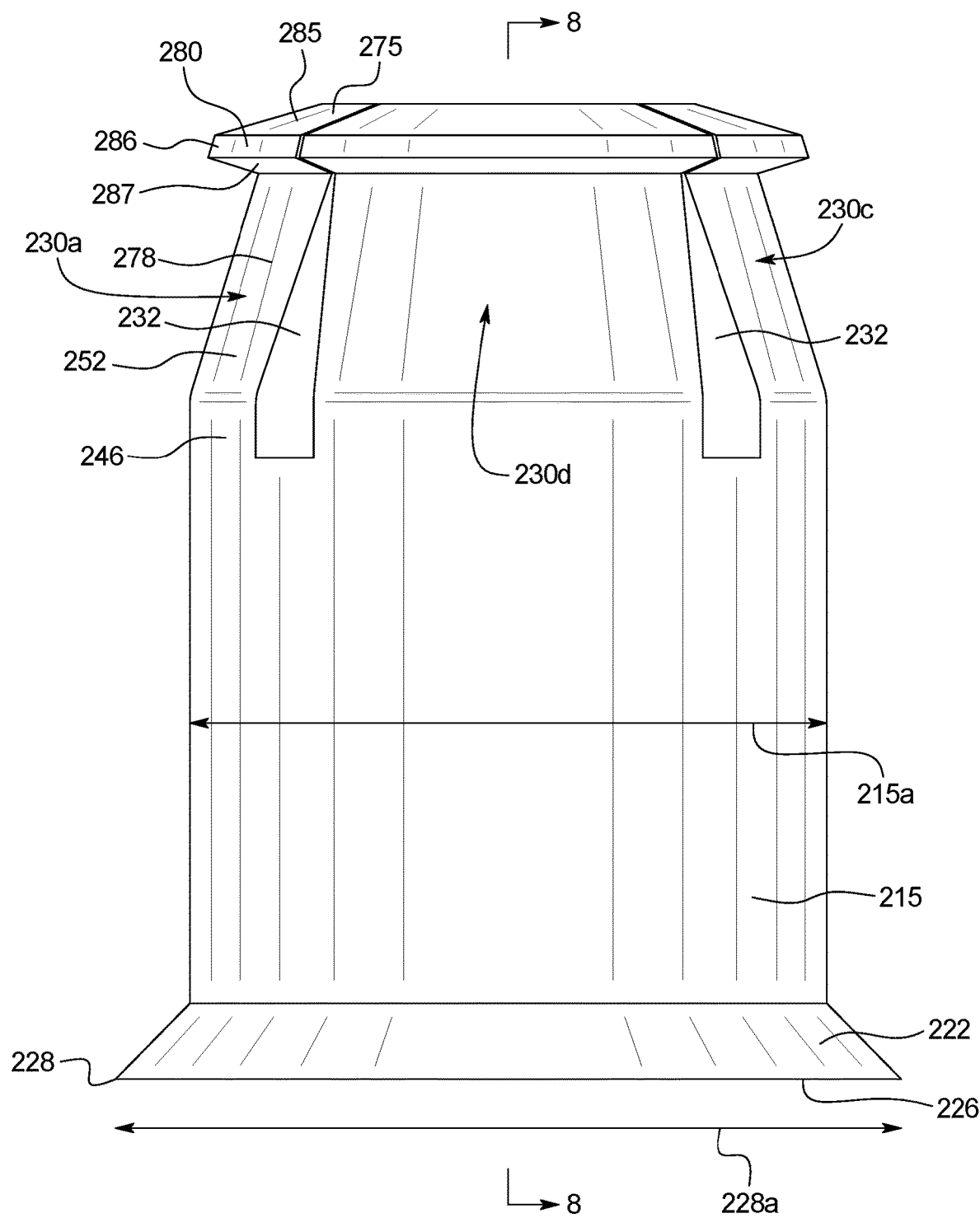
FIG. 7 is a side view of the undercut anchor of FIG. 1 after the first end of the attachment barrel of the undercut anchor is formed for insertion into a hole.
Figure 8:
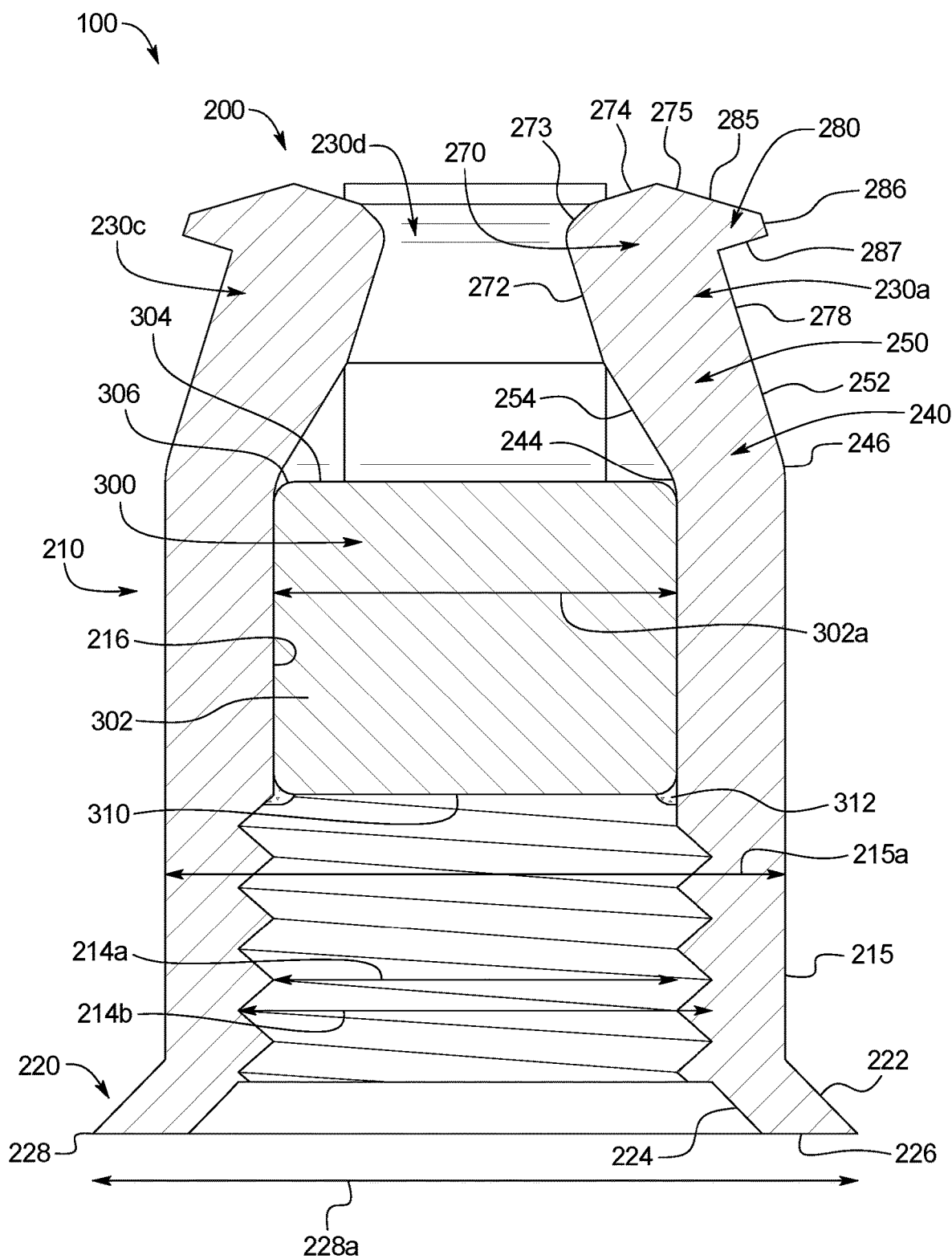
FIG. 8 is a cross sectional view of the undercut anchor of FIG. 1 after the first end of the attachment barrel of the undercut anchor is formed for insertion into a hole, and taken substantially along line 8-8 of FIG. 7.
Figure 9:
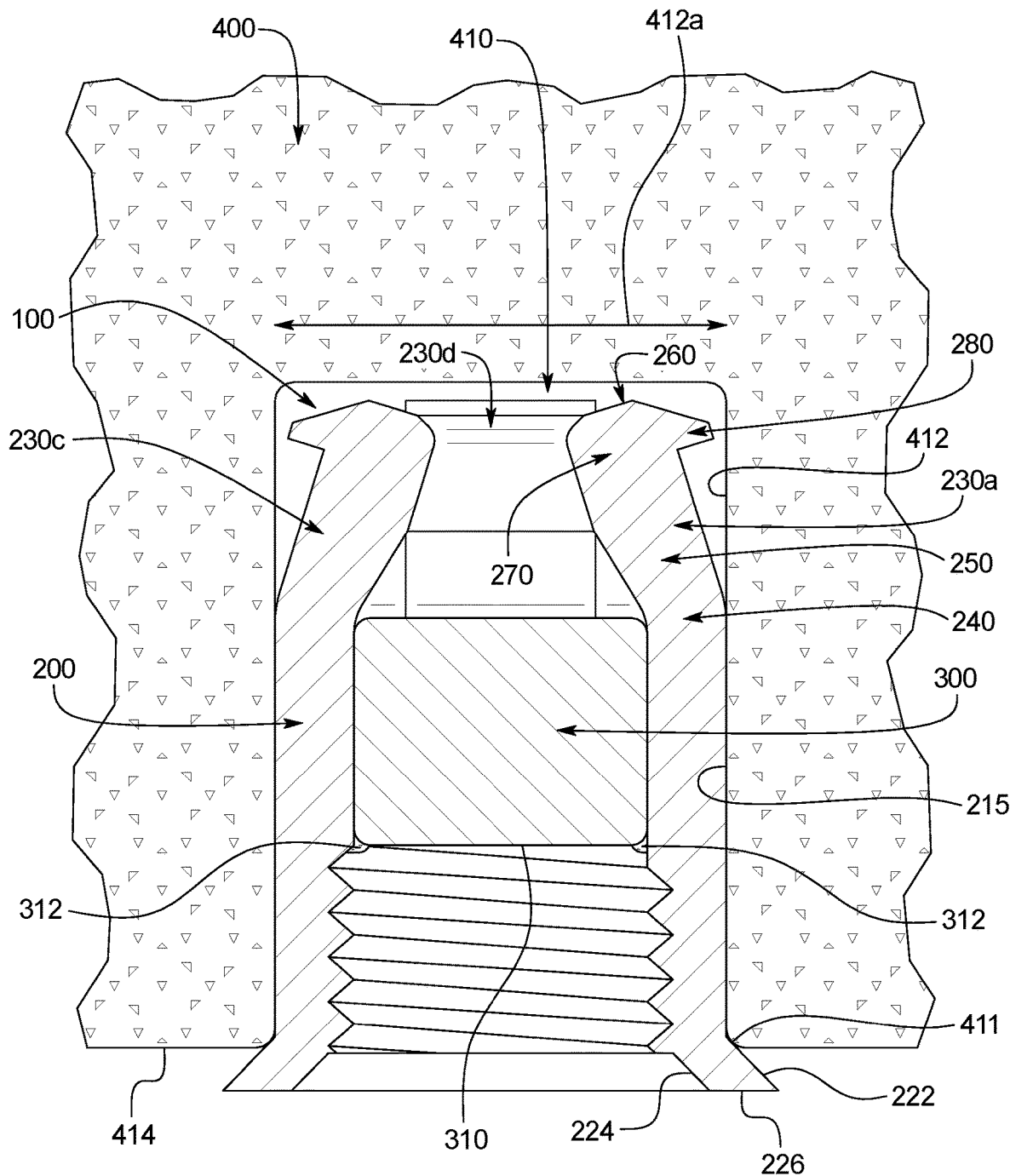
FIG. 9 a cross sectional view of the undercut anchor of FIG. 1 inserted into a hole in a concrete structure.
Figure 10:
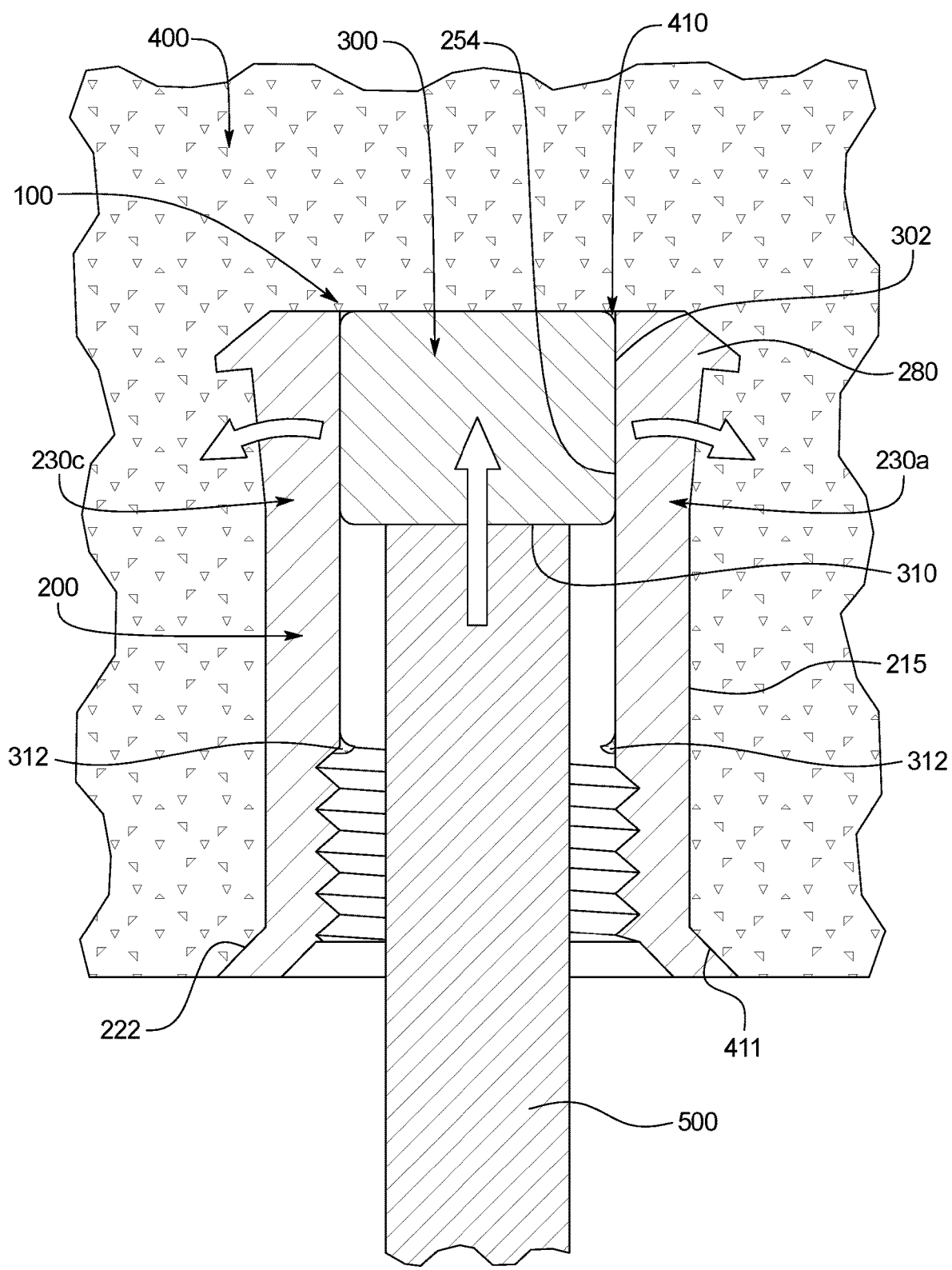
FIG. 10 is a cross sectional view of the undercut anchor of FIG. 1 after the first end of the undercut anchor is expanded in the hole of FIG. 9.

FIGS. 1, 2, 3 4, and 5 illustrate the undercut anchor at an intermediate stage of the manufacture of the undercut anchor. FIGS. 6, 7, and 8 illustrate the undercut anchor at a subsequent stage of the manufacture of the undercut anchor. FIGS. 9 and 10 illustrate the undercut anchor after manufacture and being installed in a concrete ceiling 400.

The undercut anchor 100 generally includes: (a) an attachment barrel 200; and (b) a plug 300 positioned in and moveable in the attachment barrel 200.

More specifically, the attachment barrel 200 includes: (a) a generally cylindrical body 210; (b) an outer rim 220 extending outwardly or transversely and away from a first or bottom end 211 of the body 210; and (c) a plurality of independently movable or pivotable gripping arms 230a, 230b, 230c, and 230d extending from a second or top end 212 of the body 210.

The body 210 includes a generally cylindrical wall 213. The generally cylindrical wall 213 has: (a) an outer surface 215; (b) an inner surface 216 opposite the outer surface 215 (c) internal threads 214 extending from the inner surface 216; (d) a top end 212; and (e) a bottom end 211. The inner surface 216 has an inner diameter 216a. The internal threads 214 have a crest diameter 214a greater than the inner diameter 215a. The internal threads 214 also have a trough diameter 214b greater than the crest diameter 214a. The outer surface 215 has an outer diameter 215a greater than the crest diameter 214a.

The internal threads 214 are configured in a conventional manner to threadably receive and hold a threaded fastener (such as a bolt) (not shown) to facilitate attaching objects to the concrete structure in which the anchor 100 is attached such as hanging an object or equipment from a concrete ceiling 400 (as indicated in FIGS. 9 and 10) in which the anchor 100 is attached.

The outer rim 220 of the attachment barrel 200 is integrally connected to the bottom end 211 of the body 210. The outer rim 220 has an outer angled surface 222 connected to the outer surface 215 of the body 210. The outer rim 220 has an inner angled surface 224 connected to the internal threads 214. The outer rim 220 has a bottom surface 226 connected to the inner angled surface 224 and to the outer angled surface 222. The inner angled surface 224 is configured to direct a threaded fastener (not shown) toward the internal threads 214. The outer angled surface 222 is configured to contact a rim 411 of the wall(s) that define a hole in a structure such as the hole 410 drilled in the concrete ceiling 400 (as shown in FIGS. 9 and 10). In certain embodiments, the outer angled 222 surface is configured to deform the rim 411 when the undercut anchor 100 is driven into and expanded in the hole 410. The outer angled surface 222 and the bottom surface 226 meet at an edge 228. The edge 228 has an outer diameter 228a greater than the outer diameter 215a of the body 210.

When the attachment barrel 200 is first formed, the arms 230a, 230b, 230c, and 230d extend uninterruptedly away from the body 210 (as best shown in FIGS. 1, 2, 3, 4, and 5). That is, when the attachment barrel 210 is first formed, the arms 230a, 230b, 230c, and 230d are perpendicular or substantially perpendicular to the transversely extending top end 212 of the body 210. At this point in the manufacturing process, the plurality of arms 230a, 230b, 230c, and 230d are spaced apart and define a plurality of slots 232 between each other. The top end 212 of the body 210 defines the bottom of each of these slots.

After the attachment barrel 200 is first formed, the arms 230a, 230b, 230c, and 230d are crimped inwardly toward one another. After crimping, the arms 230a, 230b, 230c, and 230d are angled toward one another (as best shown in FIGS. 6, 7, 8, and 9). It should be appreciated that crimping the arms 230a, 230b, 230c, and 230d makes the outer diameter of the arms 230a, 230b, 230c, and 230d small enough to enable insertion of the undercut anchor 100 into the hole 410 (until the outer rim 220 contacts the rim 411 of the wall(s) that define the hole 410).

When the undercut anchor 100 is installed in a hole 410, the plug 300 is moved or pushed inwardly (as described below) to move the arms 230a, 230b, 230c, and 230d outwardly and thus spread the arms 230a, 230b, 230c, and 230d away from one another to grip the inner wall(s) 412 that define the hole 410 as further discussed below. It should be appreciated that the arms 230a, 230b, 230c, and 230d thus somewhat function as an expansion cone insert to secure or anchor the undercut anchor 100 in the concrete structure such as the concrete ceiling 400.

The pivotable gripping arms 230a, 230b, 230c, and 230d in this illustrated example embodiment are identical or substantially identical. Thus, for brevity, only arm 230a is discussed in greater detail herein. It should be appreciated that in this example embodiment, the other arms 230b, 230c, and 230d have the same features or parts and function in the same manner as arm 230a although they are positioned at different points or areas of the undercut anchor 100. It should be appreciated that in other embodiments of the present disclosure, the arms 230a, 230b, 230c, and 230d do not need to be identical or substantially identical.

Pivotable gripping arm 230a includes: (a) a connector 240; (b) a ramp 250 integrally connected to the connector 240; and (c) a hook 260 integrally connected to the ramp 250. Together, the connector 240, the ramp 250, and the hook 260 form a first side 234 and a second side 236.

The pivotable gripping arm 230a is configured to be in three different positions including: (a) a first position when the attachment barrel 200 is first formed (as best shown in FIGS. 1, 2, 3, 4, and 5); (b) a second position after the arms 230a, 230b, 230c, and 230d have been crimped together (as best shown in FIGS. 6, 7, 8, and 9); and (c) a third position after the arms 230a, 230b, 230c, and 230d have been spread apart by the plug 300 (as best shown in FIG. 10).

The connector 240 of the pivotable gripping arm 230a includes: (a) an attachment end 242 integrally connected to the body 210; (b) an inner surface 244; and (c) an outer surface 246 opposite the inner surface 244.

The connector 240 connects to the body 210 at the attachment end 242. The outer surface 246 of the connector 240 extends from the outer surface 215 of the body 210. The outer surfaces 246 of the connectors 240 of the arms 230a, 230b, 230c, and 230d define an outer diameter 246a. The inner surface 244 of the connector 240 extends from the inner surface 216 of the body 210. The inner surfaces 244 of the connectors 240 of the arms 230a, 230b, 230c, and 230d define an inner diameter 244a. The connector 240 is configured to bend when the arm 230a is crimped inwardly and when the arm 230a is moved outwardly. The inner surface 244 and the outer surface 246 are curved in the circumferential direction.

Before crimping, the outer surface 246 of the connector 240 is generally aligned with the outer surface 246 of the body 210 (as best shown in FIGS. 1, 2, 3, 4, and 5). After crimping, the outer surface 246 of the connector 240 is angled inwardly relative to the outer surface 215 of the body 210 (as best shown in FIGS. 6, 7, 8, and 9). After spreading, the outer surface 246 of the connector 240 is angled outwardly relative to the outer surface 215 of the body 210 (as best shown in FIG. 10).

Figure 1:
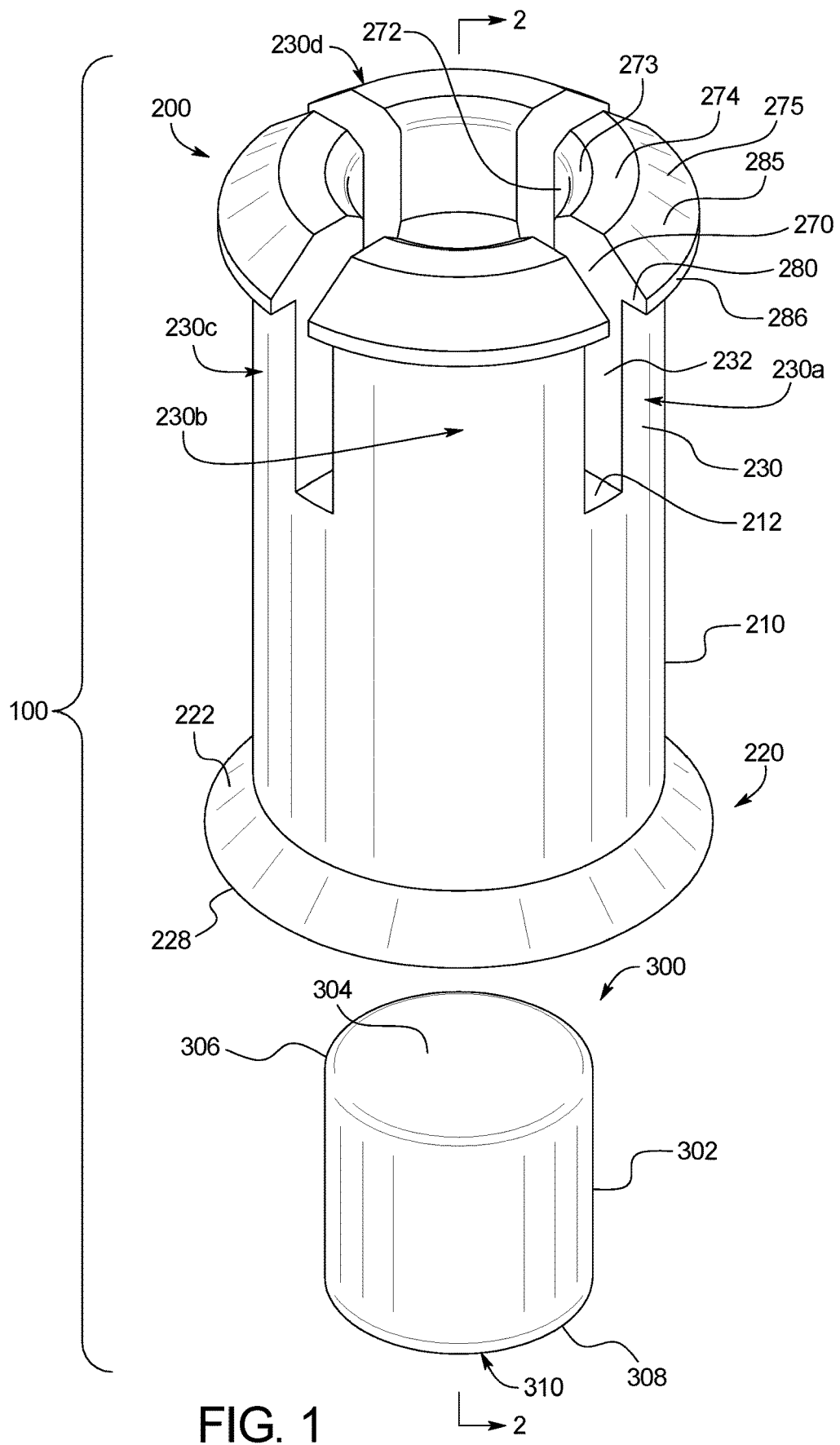
FIG. 1 is an exploded top perspective view of an undercut anchor of one example embodiment of the present disclosure illustrating the plug and the attachment barrel of the undercut anchor before a first end of the attachment barrel (that includes the gripping arms) is formed for insertion into a hole in a concrete structure.
Figure 2:
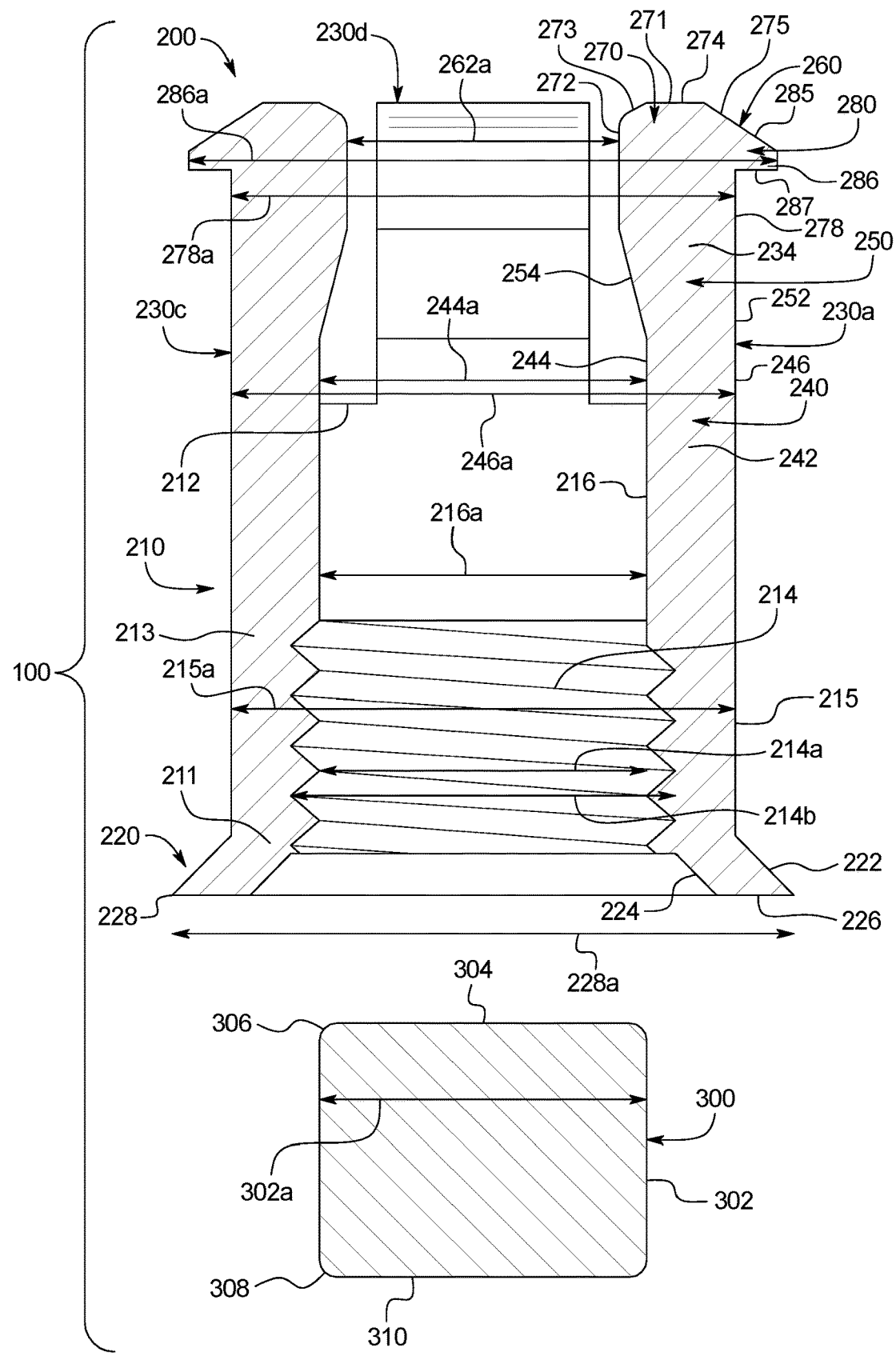
FIG. 2 is a cross sectional view of the undercut anchor of FIG. 1 before the first end of the attachment barrel of the undercut anchor is formed for insertion into a hole, and taken substantially along line 2-2 of FIG. 1.
Figure 3:
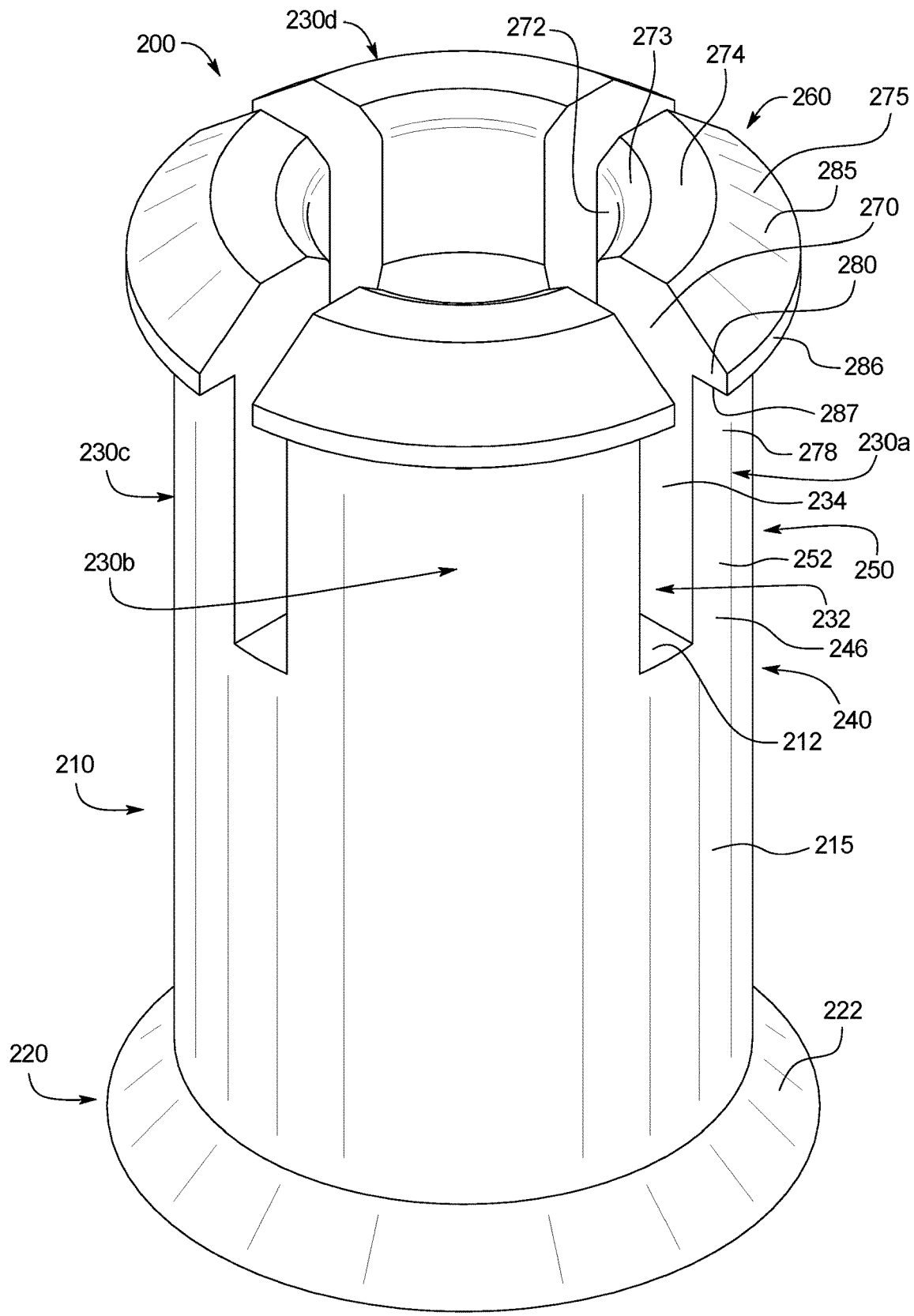
FIG. 3 is an enlarged perspective view of the attachment barrel of the undercut anchor of FIG. 1 before the first end of the attachment barrel of the undercut anchor is formed for insertion into a hole.
Figure 4:
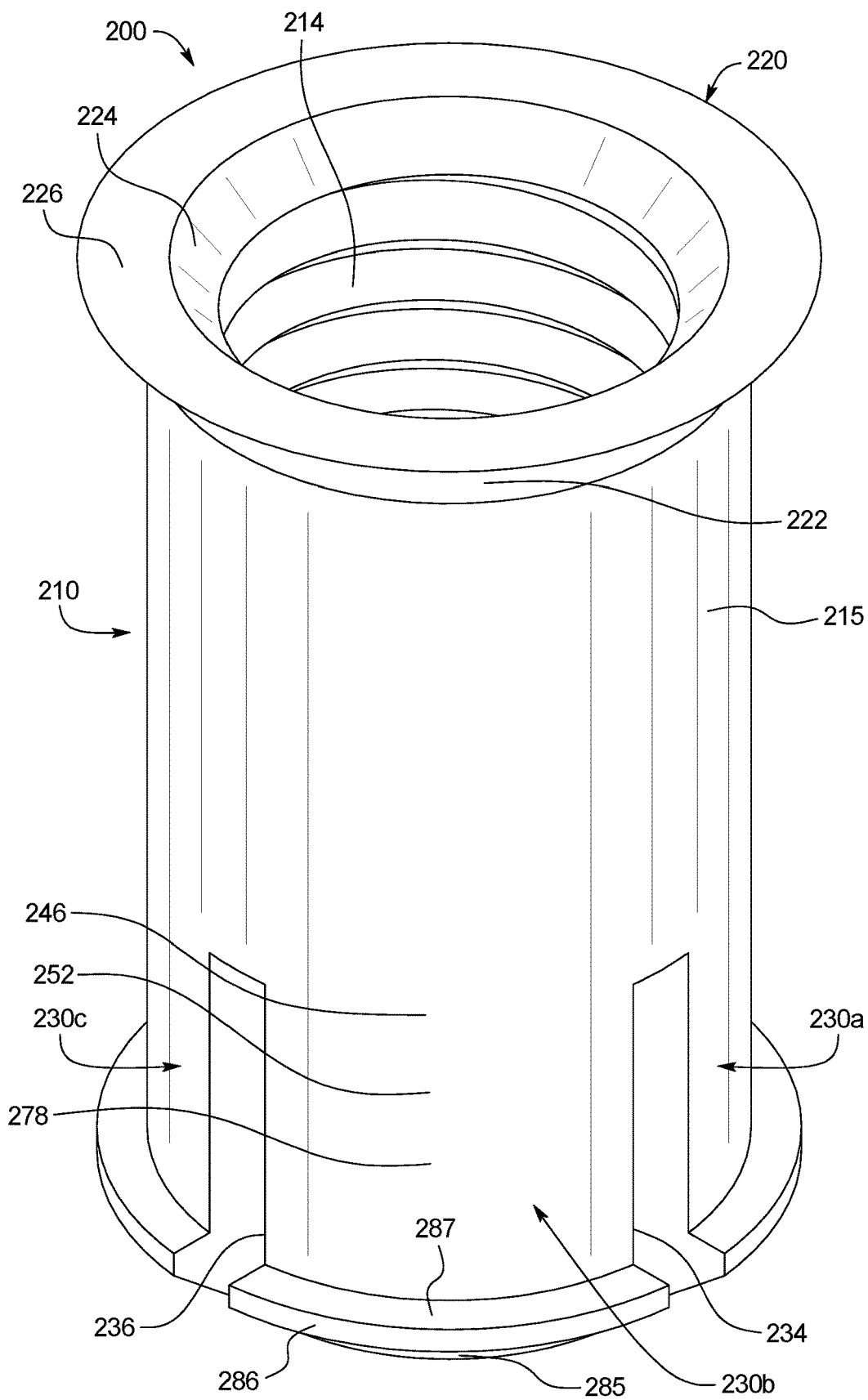
FIG. 4 is an enlarged bottom perspective view of the undercut anchor of FIG. 1 before the first end of the attachment barrel of the undercut anchor is formed for insertion into a hole.
Figure 5:
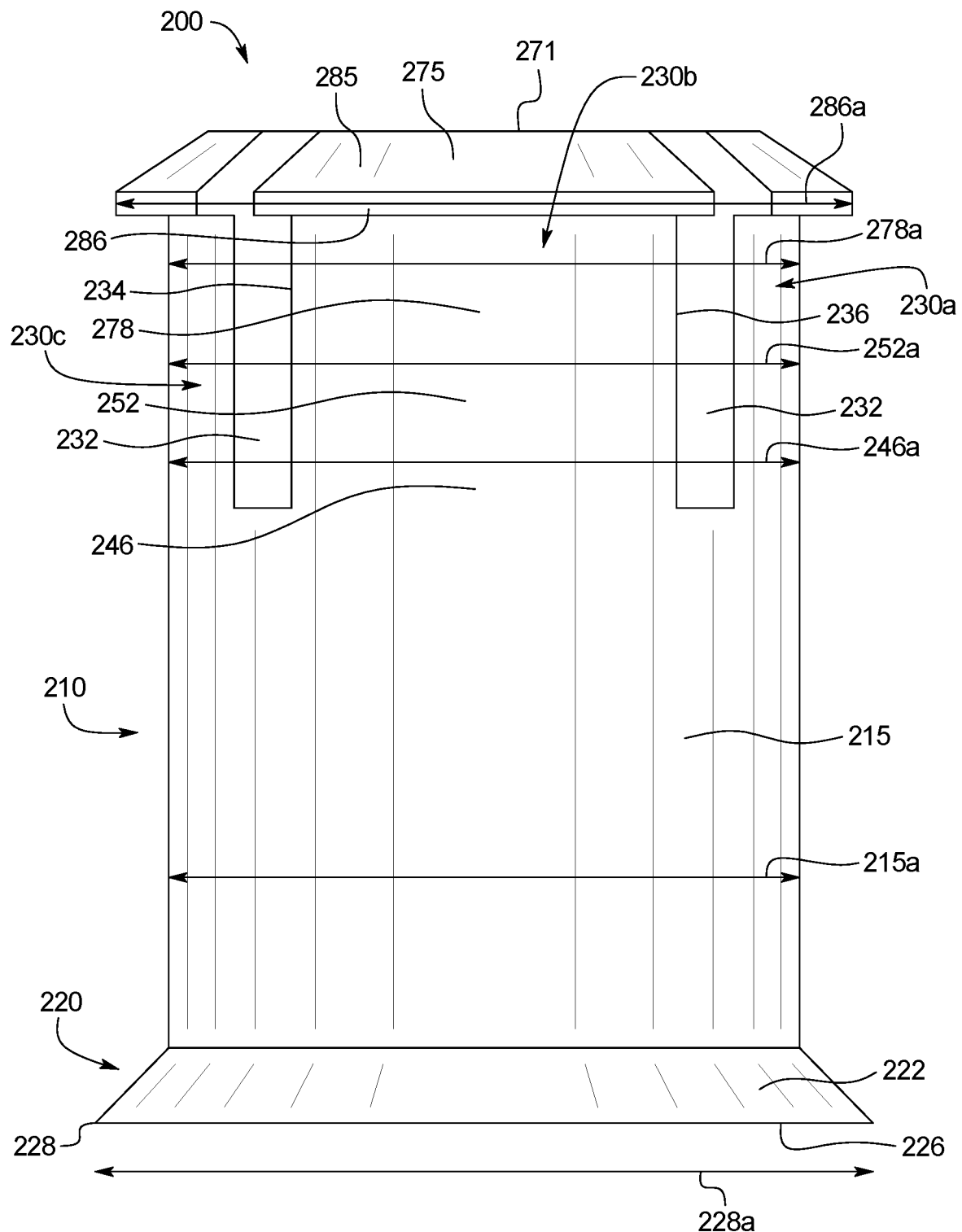
FIG. 5 is a side view of the undercut anchor of FIG. 1 before the first end of the attachment barrel of the undercut anchor is formed for insertion into a hole.

Before crimping, the inner surface 244 of the connector 240 is generally aligned with the inner surface 216 of the body 210 (as best shown in FIG. 2). After crimping, the inner surface 244 of the connector 240 is angled inwardly relative to the inner surface 216 of the body 210 (as best shown in FIGS. 8 and 9). After spreading, the inner surface 244 of the connector 240 is angled outwardly relative to the inner surface 216 of the body 210 (as best shown in FIG. 10).

The ramp 250 of arm 230a includes: (a) an outer surface 252; and (b) an inner sloped surface 254 opposite and diagonal to the outer surface 252. The outer surface 252 of the ramp 250 extends from the outer surface 246 of the connector 240. The inner sloped surface 254 extends from the inner surface 244 of the connector 240. The outer surface 252 and the inner sloped surface 254 are curved in the circumferential direction.

Before crimping, the outer surface 252 of the ramp 250 is generally aligned with the outer surfaces 246 and 215 of the connector and the body 210 (as best shown in FIGS. 1, 2, 3, 4, and 5). After crimping, the outer surface 252 of the ramp 250 is angled inwardly relative to the outer surface 252 of the body 210 (as best shown in FIGS. 6, 7, 8, and 9). After spreading outwardly, the outer surface 252 of the ramp 250 is angled outwardly relative to the outer surface 215 of the body 210 (as best shown in FIG. 10).

Before crimping, the inner sloped surface 254 of the ramp 250 is angled inwardly relative to the inner surface 216 of the body 210 (as best shown in FIG. 2). After crimping, the inner sloped surface 254 is angled further inwardly relative to the inner surface 216 of the body 210 (as best shown in FIGS. 8 and 9). After spreading outwardly, the inner sloped surface 254 is slightly angled inward relative to the inner surface 216 of the body 210 (as best shown in FIG. 10).

The hook 260 of arm 230a includes: (a) a shank 270; and (b) a barb 280 integrally connected to the shank 270. The hook 260 is integrally connected to the ramp 250 via the shank 270.

The shank 270 includes: (a) a free end 271; (b) an inner surface 272; (c) a rounded edge 273; (d) a top surface 274; (e) an angled surface 275; and (f) an outer surface 278 opposite the inner surface 272. The inner surface 272 of the shank 270 extends from the inner sloped surface 254. The rounded edge 273 extends from the inner surface 272 of the shank 270. The top surface 274 extends from the rounded edge 273. The angled surface 275 of the shank 270 extends from the top surface 274. The outer surface 278 of the shank 270 extends from the outer surface 252 of the ramp 250.

The shank 270 is generally thicker than the connector 240. The inner surface 272, the rounded edge 273, the angled surface 275, the outer surface 276, and the outer surface 278 are curved in the circumferential direction.

In the first position (before crimping, as best shown in FIGS. 1, 2, 3, 4, and 5), the free ends 271 are spaced apart. In the second position, (after crimping, as best shown in FIGS. 6, 7, 8, and 9), the free ends 271 are next to one another such that the first and second respective sides 234 and 236 of the arms 230a, 230b, 230c, and 230d contact one another and the top ends of the slots 232 are generally closed at the free ends 271. In the third position (after spreading outwardly, as best shown in FIG. 10), the free ends 271 are spaced further apart than in the first position such that the slots 232 are wider near the free ends 271 than at the top end 212 of the body 210.

The inner surfaces 272 of the of the shanks 270 of the arms 230a, 230b, 230c, and 230d define an inner diameter 272a. In the first position, (before crimping, as best shown in FIG. 2), the inner surface 272 of the shank 270 is parallel or substantially parallel to the inner surface 216 of the body 210. In the second position, (after crimping, as best shown in FIGS. 8 and 9), the inner surface 272 of the shank 270 is angled inwardly relative to the inner surface 216 of the body 210. In the third position, (after spreading outwardly, as best shown in FIG. 10), the inner surface 272 of the shank 270 is angled outwardly relative to the inner surface 216 of the body 210.

In the first, second, and third positions, the angled surface 275 of the shank 270 is angled inwardly relative to the outer surface 215 of the body 210.

The outer surfaces 278 of the shanks 270 of the arms 230a, 230b, 230c, and 230d define an outer diameter 278a. In the first position (before crimping, as shown in FIGS. 1, 2, 3, 4, and 5), the outer surface 278 of the shank 270 is parallel or substantially parallel to the outer surface 215 of the body 210. In the second position (after crimping, as best shown in FIGS. 6, 7, 8 and 9), the outer surface 278 of the shank 270 is angled inwardly relative to the outer surface 215 of the body 210. In the third position (after spreading outwardly, as best shown in FIG. 10), the outer surface 278 of the shank 270 is angled outwardly relative to the outer surface 215 of the body 210.

The barb 280 includes: (a) an angled surface 285; (b) an outer surface 286; (c) a bottom surface 287; and (d) a cutting edge (not labeled) at the intersection of the outer surface 286 and the bottom surface 287. The angled surface 285 of the barb 280 extends from the angled surface 275 of the shank 270. The outer surface 286 of the barb 280 extends from the angled surface 285 of the barb 280. The bottom surface 287 of the barb 280 extends from the outer surface 286 of the barb 280. The bottom surface 287 of the barb 280 extends from the outer surface 278 of the shank 270. The angled surface 285 and the outer surface 286 are curved.

The barb 280 extends radially or outwardly from the shank 270. The barb 280 is configured to knife into, cut into, slice into, and/or embed into the inner wall(s) 412 that defines the hole 410 in the concrete ceiling 400 (as shown in FIG. 10). It should be appreciated that the barb 280 is a self-undercutting feature that provides a strong interlock between the undercut anchor 100 and the concrete ceiling 400.

In the first, second, and third positions, the angled surface 285 of the barb 280 is angled inwardly relative to the outer surface 215 of the body 210.

The outer surfaces 286 of the barbs 280 of the arms 230a, 230b, 230c, and 230d define an outer diameter 286a. In the first position (before crimping, as best shown in FIGS. 1, 2, 3, 4, and 5), the outer surface 286 of the barb 280 is parallel or substantially parallel to the outer surface 215 of the body 210. In the second position (after crimping, as best shown in FIGS. 6, 7, 8, and 9), the outer surface 286 of the barb 280 is angled inwardly relative to the outer surface 215 of the body 210. In the third position (after spreading outwardly, as shown in FIG. 10), the outer surface 286 of the barb 280 is angled outwardly relative to the outer surface 215 of the body 210.

The bottom surface 287 of the barb 280 is generally perpendicular to the outer surface 278 of the shank 270 and to the outer surface 286 of the barb 280.

Turning now to the plug 300, the example plug 300 is generally cylindrical and includes a generally cylindrical solid body having: (a) an outer surface 302; (b) a top surface 304; (c) a top rounded edge 306; (d) a bottom rounded edge 308; and (e) a bottom surface 310. The outer surface 302 of the plug 300 has an outer diameter 302a. The outer diameter 302a of the plug 300 is smaller than the crest diameter 214a of the internal threads 214. The outer diameter 302a of the plug 300 is slightly smaller than the inner diameter 215a of the body 210. The plug 300 is configured to be inserted into the attachment barrel 200 via the bottom end 211 of the body 210 and positioned at a first position shown in FIGS. 8 and 9. The outer diameter 302a of the plug 300 passes through the crest diameter 214a of the internal threads 214 to get to that first position. The outer diameter 302a of the plug 300 generally has a clearance fit with the inner surface 215 of the body 210. In this illustrated example embodiment, the plug 300 is retained at the first position in the attachment barrel with an adhesive 312 deposited between the inner surface 216 of the body 210 and the outer surface 302 of the plug 300. It should be appreciated that the plug may be of other suitable shapes and configurations in accordance with the present disclosure.

The plug 300 is configured to move from a first position shown in FIGS. 8 and 9 to a second position shown in FIG. 10. More specifically, the plug 300 is configured to be driven against the inner sloped surfaces 254 of the ramps 250 of the arms 230a, 230b, 230c, and 230d with a setting tool 500 hammered against the bottom surface 310 of the plug 300 (as best shown in FIG. 10). When the plug 300 is driven in this manner, the adhesive bonds are broken and the top rounded edge 306 of the plug 300 first contacts the inner sloped surfaces 254 of the arms 230a, 230b, 230c, and 230d. When the plug 300 is driven against the inner sloped surfaces 254, the arms 230a, 230b, 230c, and 230d spread apart from one another. When the plug 300 has been fully driven against the inner sloped surfaces 254 of the arms 230a, 230b, 230c, and 230d, the inner sloped surfaces 254 are spread beyond the inner diameter 216a of the inner surface 216 of the body 210. When the plug 300 has been fully driven against the inner sloped surfaces 254 of the gripping arms 230a, 230b, 230c, and 230d, the diameters 246a, 252a, 278a, and 286a of the outer surfaces 246, 252, 278, and 286 of the arms 230a, 230b, 230c, and 230d are greater than the diameter 215a of the body 210.

In various embodiments, the plug 300 is made from a harder material than the attachment barrel and is thus configured to cause the gripping arms to partially deform as generally shown in FIG. 10 when the plug 300 causes the gripping arms 230a, 230b, 230c, and 230d to spread apart and the barbs to cut into the inner wall(s) that define the hole.

It should be appreciated that the plug 300 continually exerts outward pressure on the inner sloped surfaces 254 of the arms 230a, 230b, 230c, and 230d. Thus, the outer surfaces 246, 252, 278, and 286 of the connectors 240, the ramps 250, and the hooks 260 of the arms 230a, 230b, 230c, and 230d contact and grip the inner wall(s) 412 that define the hole 410. Thus, the barbs 280 are driven into the inner wall(s) 412 that define the hole 410. By deeply driving the barbs 280 into the inner wall(s) 412, the undercut anchor 100 is securely mechanically interlocked with the concrete ceiling 400, even if the concrete ceiling 400 is cracked.

It should also be appreciated that as the plug 300 is driven against the ramps 250, the attachment barrel 200 is driven into the hole 410 such that the outer rim 220 deforms the rim 411 of the wall(s) 412 that define the hole 410. In the third position of the arms 230a, 230b, 230c, and 230d (after spreading, as best shown in FIG. 10), the bottom surface 226 of the outer rim 220 is generally flush with a bottom surface 414 of the structure 400.

It should also be appreciated that FIGS. 1 to 8 generally illustrate one method of making an undercut anchor in accordance with the present disclosure.

Generally, in various embodiments, the method of making an undercut anchor of the present disclosure includes: (a) forming the attachment barrel 200; (b) inserting the plug 300 into the attachment barrel 200; (c) adhesively attaching such as by gluing the plug 300 in the attachment barrel 200; and (d) crimping the attachment barrel 200. It should be appreciated that steps (b), (c), and (d) may be performed in any suitable order. It should be appreciated that this adhesive attachment provides a suitable mechanical attachment between these parts.

More specifically, this method includes forming the attachment barrel 200 (as best shown in FIGS. 1, 2, 3, 4, and 5). The attachment barrel 200 is formed to have the body 210, the outer rim 220, and the arms 230a, 230b, 230c, 230d as described above and shown in FIGS. 1, 2, 3, 4, and 5.

The method further includes inserting the plug 300 into the attachment barrel 200 (as best shown in FIG. 8). More specifically, the plug 300 is inserted into the attachment barrel 200 via the bottom end 211 of the body 210 of the attachment barrel 200.

The method further includes temporary securing such as by gluing or otherwise adhesively attaching the plug 300 in the attachment barrel 200 (as best shown in FIG. 8). More specifically, in various embodiments, a temporary securing mechanism such as the adhesive 312 is applied to one or more outer surfaces of the plug 300 before the plug 300 is inserted into the attachment barrel 200. In various embodiments, the adhesive 312 is applied to the inner surface 215 of the attachment barrel 312 before the plug 300 is inserted into the attachment barrel 200. In various embodiments, the adhesive 312 is applied to the inner surface 215 of the attachment barrel 200 and to the bottom rounded edge 308 of the plug 300 after the plug 300 is inserted into the attachment barrel 200. It should be appreciated that adhesive is just one method that can be employed to secure the plug in the attachment barrel; and that other methods or mechanical mechanisms can be used to do so in accordance with the present disclosure. For example, an oversized plastic disk can be inserted into the threads to hold the plug in position.

The method further includes crimping the attachment barrel 200 (as best shown in FIGS. 6, 7, and 8). More specifically, the attachment barrel 200 is crimped such that the arms 230a, 230b, 230c, and 230d contact one another at the free ends 271 as described above and shown in FIGS. 6, 7, and 8.

FIGS. 9 and 10 illustrate one method of using an undercut anchor in accordance with the present disclosure.

Generally, in various embodiments, the method of using an undercut anchor of the present disclosure includes: (a) drilling a hole 410 to a specific depth; (b) cleaning the hole 410; (c) inserting the undercut anchor 100 into the hole 410; and (d) moving the position of the plug 300 of the undercut anchor 100.

More specifically, the method includes drilling a hole 410 to a specific depth (as best shown in FIGS. 9 and 10). More specifically, the hole 410 is drilled in the concrete ceiling 400 with a conventional drill and masonry drill bit such that the hole 410 does not extend into reinforcement members (not shown) in the concrete ceiling. In various embodiments the hole 410 is generally drilled to nominally three quarters of an inch in depth. In various embodiments, a stop collar is used with the drill bit to ensure the drill does not exceed the specific depth.

The method further includes cleaning the hole 410. More specifically, debris may be blown out of the hole 410 with pressurized air. Alternatively, debris may be removed from the hole 410 a vacuum cleaner (not shown).

The method further includes moving the plug such as by hammering the plug 300 of the undercut anchor 100 (as best shown in FIG. 10). More specifically, a setting tool 500 is inserted into the attachment barrel 200 and placed against the bottom surface 310 of the plug 300. In various embodiments, the setting tool 500 is struck with a conventional hammer. In various embodiments, the setting tool 500 is used in conjunction with a hammer drill set to a hammer-only mode. It should be appreciated that, as the plug 300 is hammered, the arms 230a, 230b, 230c, and 230d spread apart relative to one another to embed the barbs 280 of the arms 230a, 230b, 230c, and 230d into the inner wall(s) 412 that defines the hole 410.

It should be appreciated that the embodiment of the undercut anchor of the present disclosure (except for the adhesive) can be made of a suitable metal such as steel. It should further be appreciated that the undercut anchor of the present disclosure can be made of other suitable materials.

More specifically, in this illustrated example embodiment, the attachment barrel is made from a suitable metal such as steel. It should be appreciated that the attachment barrel can be made from other suitable materials.

In this illustrated example embodiment, the plug is made from a suitable metal such as steel. It should be appreciated that the plug can be made from other suitable materials.

In this illustrated example embodiment, the adhesive is a hot melt glue. It should be appreciated that the adhesive can be made from other suitable materials.

One advantage to using the undercut anchor 100 of the present disclosure is that the undercut anchor 100 may be used in cracked concrete. Thus, equipment may be installed onto the concrete ceiling without repairing or replacing the ceiling. Thus, safety systems (such as fire sprinklers) may be installed in cracked concrete ceilings. This improves efficiency and safety and also reduces cost.

Another advantage to using the undercut anchor 100 of the present disclosure is that the undercut anchor 100 provides higher tension values (force needed to tear out an anchor from the concrete structure) than previous anchors.

Thus, in certain implementations, fewer anchors are needed for a given installation. This can reduce cost.

Another advantage to using the undercut anchor 100 of the present disclosure is that the undercut anchor 100 a lower cost than previous anchors.

Another advantage of using the undercut anchor 100 of the present disclosure is that a standard stop masonry drill bit can be used as opposed to using specialty undercut drill bits that are currently used for installing undercut anchors. This saves time and reduces tooling cost.

It should be appreciated that in various alternative embodiments, the quantity of gripping arms may vary and specifically may be less or more than the example four gripping arms.

It should be appreciated that in various alternative embodiments, the shape or configuration and the quantity of gripping arms and the barbs may vary.

It should be further appreciated that in various alternative embodiments, the gripping arms 230a, 230b, 230c, and 230d may be close to one another but not in contact in the second position (after crimping).

It should be further appreciated that in various alternative embodiments, the outer rim 220 may be of a different shape or configuration.

It should be further appreciated that in various alternative embodiments, the outer rim may be omitted.

It should be further appreciated that in various alternative embodiments, the body of the attachment barrel may be of a different shape or configuration.

It should be appreciated that in various alternative embodiments, the rounded edge 273 may be chamfered.

It should be further appreciated that in various alternative embodiments, the rounded edge 273 may be omitted.

It should be further appreciated that in various alternative embodiments, the inner angled surface 224 of the outer rim 220 may be parallel or substantially parallel with the inner surface 216 of the body 210.

It should be further appreciated that in various alternative embodiments, the internal threads 214 may be left-handed (instead of right-handed).

It should be appreciated from the above that various embodiments of the present disclosure provide an undercut anchor comprising: (a) an attachment barrel including: (i) a cylindrical body; (ii) an outer rim extending outwardly from a bottom end of the body; and (iii) a plurality of independently pivotable gripping arms extending from a top end of the body, each gripping arm including: (a) a connector, (b) a ramp connected to the connector, and (c) a hook connected to the ramp; and (b) a cylindrical plug positioned in and moveable in the attachment barrel.

In various such embodiments of the undercut anchor, the body has internal threads configured to threadably receive a threaded fastener.

In various such embodiments of the undercut anchor, the outer rim is configured to contact a rim of a wall that defines a hole in a structure.

In various such embodiments of the undercut anchor, the outer rim is configured to deform the rim of the wall that defines the hole when the undercut anchor is driven into the hole.

In various such embodiments of the undercut anchor, the plug is configured to spread the pivotable gripping arms away from one another.

In various such embodiments of the undercut anchor, the pivotable gripping arms are spaced apart to define a plurality of slots with one another and with the top end of the body.

In various such embodiments of the undercut anchor, each ramp includes: (a) an outer surface; and (b) an inner sloped surface opposite and diagonal to the outer surface.

In various such embodiments of the undercut anchor, each hook includes: (a) a shank; and (b) a barb extending radially from the shank.

In various such embodiments of the undercut anchor, the barb is configured to embed into an inner wall that defines the hole in the structure.

In various such embodiments of the undercut anchor, the plug is retained in the attachment barrel by an adhesive.

It should also be appreciated from the above that various embodiments of the present disclosure provide an undercut anchor comprising: an attachment barrel including: cylindrical body; an outer rim integrally connected to and extending outwardly and away from a bottom end of the body; and a plurality of independently pivotable gripping arms integrally connected to and extending from a top end of the body, each pivotable gripping arm including: a connector integrally connected to the body; a ramp integrally connected to the connector and having an inner sloped surface; and a hook integrally connected to the ramp, each hook including a shank, and a barb integrally connected to and extending radially from the shank; and a cylindrical plug positioned in and moveable in the attachment barrel.

In various such embodiments of the undercut anchor, when the pivotable arms are configured to spread apart from one another when the plug is driven against inner sloped surfaces of the ramps.

In various such embodiments of the undercut anchor, the pivotable gripping arms are configured to spread beyond a diameter of the body when the plug is driven against the inner sloped surfaces of the ramps.

In various such embodiments of the undercut anchor, the plug is configured to exert outward pressure on the inner sloped surfaces of the ramps.

In various such embodiments of the undercut anchor, the pivotable gripping arms are configured to contact and grip an inner wall that defines a hole of a structure.

It will be understood that modifications and variations may be effected without departing from the scope of the novel concepts of the present invention, and it is understood that this application is to be limited only by the scope of the claims.

The invention is claimed as follows:

1. An undercut anchor comprising:
   (a) an attachment barrel including:
      (i) a cylindrical body having a bottom end and a top end, the body including a first portion beginning at the bottom end of the body and having internal threads configured to threadably receive a threaded fastener, the body including a second portion connected to the first portion, having an inner cylindrical surface without inner threads, and ending at the top end of the body, the second portion having a first height;
      (ii) an outer rim connected to and extending outwardly from the bottom end of the body; and
      (iii) four independently pivotable gripping arms connected to and extending from the top end of the body, each gripping arm including:
         (a) a connector connected to the second portion of the body,
         (b) a ramp connected to the connector, and
         (c) a hook connected to the ramp, the hook including a shank connected to the ramp and a barb extending radially outwardly from the shank, wherein the connector has a section with a constant first thickness, the shank has a section with a constant third thickness that is greater than the first thickness, and the ramp has an increasing thickness from the connector to the shank, wherein part of the barb has a fourth thickness that is greater than the third thickness,
      wherein the four independently pivotable gripping arms are configured to be positioned in respective positions such that a slot is defined between each pair of adjacent pivotable gripping arms, wherein each of the slots has a flat bottom surface adjacent the connectors of the respective pair of adjacent pivotable gripping arms, and wherein each of the slots narrows from the connectors of the respective pair of adjacent pivotable gripping arms to the hooks of the respective pair of adjacent pivotable gripping arms; and
   (b) a cylindrical plug positioned in the second portion of the body of the attachment barrel prior to installation of the undercut anchor and moveable into engagement with the four independently pivotable gripping arms of the attachment barrel during installation of the undercut anchor, the cylindrical plug having an outer cylindrical surface configured to engage the inner cylindrical surface of the second portion of the body prior to installation, the cylindrical plug having a second height substantially equal to the first height of the inner surface of the second portion of the body.

2. The undercut anchor of claim 1, wherein the body has internal threads configured to threadably receive a threaded fastener.

3. The undercut anchor of claim 1, wherein the outer rim is configured to contact a rim of a wall that defines a hole in a structure.

4. The undercut anchor of claim 3, wherein the outer rim is configured to deform the rim of the wall that defines the hole when the undercut anchor is driven into the hole.

5. The undercut anchor of claim 1, wherein the plug is configured to spread the pivotable gripping arms away from one another.

6. The undercut anchor of claim 1, wherein each ramp includes:
   (a) an outer surface; and
   (b) an inner sloped surface opposite and diagonal to the outer surface.

7. The undercut anchor of claim 1, wherein the barb is configured to embed into an inner wall that defines the hole in the structure.

8. The undercut anchor of claim 1, wherein the plug is retained in the attachment barrel by an adhesive.

9. An undercut anchor comprising:
   an attachment barrel including:
      a cylindrical body having a bottom end and a top end, the body including a first portion beginning at the bottom end of the body and having internal threads configured to threadably receive a threaded fastener, the body including a second portion connected to the first portion, having an inner cylindrical surface without inner threads, and ending at the top end of the body, the second portion having a first height;
      an outer rim integrally connected to and extending outwardly and away from the bottom end of the body; and
      at least three independently pivotable gripping arms integrally connected to and extending from the top end of the body, each pivotable gripping arm including:

a connector integrally connected to the second portion of the body;
a ramp integrally connected to the connector and having an inner sloped surface; and
a hook integrally connected to the ramp, each hook including a shank, and a barb integrally connected to and extending radially outwardly from the shank, wherein the connector has a section with a constant first thickness, the shank has a section with a constant third thickness that is greater than the first thickness, and the ramp has an increasing thickness from the connector to the shank, wherein part of the barb has a fourth thickness that is greater than the third thickness, wherein the at least three independently pivotable gripping arms are configured to be positioned in respective positions such that a slot is defined between each pair of adjacent pivotable gripping arms, wherein each of the slots has a flat bottom surface adjacent the connectors of the respective pair of adjacent pivotable gripping arms, and wherein each of the slots narrows from the connectors of the respective pair of adjacent pivotable gripping arms to the hooks of the respective pair of adjacent pivotable gripping arms; and
a cylindrical plug positioned in the second portion of the body of the attachment barrel prior to installation of the undercut anchor and moveable into engagement with the at least three independently pivotable gripping arms of the attachment barrel during installation of the undercut anchor, the cylindrical plug having an outer cylindrical surface configured to engage the inner cylindrical surface of the second portion of the body prior to installation of the undercut anchor, the cylindrical plug having a second height substantially equal to the first height of the inner surface of the second portion of the body.

10. The undercut anchor of claim 9, wherein when the pivotable arms are configured to spread apart from one another when the plug is driven against inner sloped surfaces of the ramps.

11. The undercut anchor of claim 9, wherein the pivotable gripping arms are configured to spread beyond a diameter of the body when the plug is driven against the inner sloped surfaces of the ramps.

12. The undercut anchor of claim 9, wherein the plug is configured to exert outward pressure on the inner sloped surfaces of the ramps.

13. The undercut anchor of claim 9, wherein the pivotable gripping arms are configured to contact and grip an inner wall that defines a hole of a structure.

14. An undercut anchor comprising:
an attachment barrel including:
(i) a cylindrical body having a bottom end and a top end, the body including a first portion beginning at the bottom end of the body and having internal threads configured to threadably receive a threaded fastener, the body including a second portion connected to the first portion, having an inner cylindrical surface without inner threads, and ending at the top end of the body, the second portion having a first height;
(ii) an outer rim extending outwardly from a bottom end of the body; and
(iii) four independently pivotable gripping arms extending from a top end of the body, each gripping arm including:
(a) a connector connected to the second portion of the body,
(b) a ramp connected to the connector and having an outer surface and an inner sloped surface opposite and diagonal to the outer surface, and
(c) a hook connected to the ramp, the hook including a shank connected to the ramp and a barb extending radially outwardly from the shank, wherein the connector has a section with a constant first thickness, the shank has a section with a constant third thickness that is greater than the first thickness, and the ramp has an increasing thickness from the connector to the shank, wherein a first part of the barb has a fourth thickness that is greater than the third thickness, wherein a second part of the barb has a fifth thickness that is less than the fourth thickness,
wherein the four independently pivotable gripping arms are configured to be positioned in respective positions such that a slot is defined between each pair of adjacent pivotable gripping arms, wherein each of the slots has a flat bottom surface adjacent the connectors of the respective pair of adjacent pivotable gripping arms, and wherein each of the slots narrows from the connectors of the respective pair of adjacent pivotable gripping arms to the hooks of the respective pair of adjacent pivotable gripping arms; and
a cylindrical plug positioned in the second portion of the body of the attachment barrel prior to installation of the undercut anchor and temporarily retained in the second portion of the body of the attachment barrel by an adhesive, the cylindrical plug having an outer cylindrical surface configured to engage the inner cylindrical surface of the second portion of the body, the cylindrical plug having a second height substantially equal to the first height of the inner surface of the second portion of the body, the plug configured to be moved into the connector to engage the ramps of the pivotable gripping arms and to spread the pivotable gripping arms away from one another during installation of the undercut anchor.

* * * * *